(12) United States Patent
Chang

(10) Patent No.: US 9,073,231 B2
(45) Date of Patent: Jul. 7, 2015

(54) SUPPORTS FOR A TABLE SAW BLADE ASSEMBLY

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 86 days.

(21) Appl. No.: 14/018,581

(22) Filed: Sep. 5, 2013

(65) Prior Publication Data

US 2015/0059547 A1 Mar. 5, 2015

(51) Int. Cl.
*B27B 5/36* (2006.01)
*B23D 45/06* (2006.01)
*B27B 5/24* (2006.01)

(52) U.S. Cl.
CPC .............. *B27B 5/36* (2013.01); *Y10T 83/7697* (2015.04); *B23D 45/06* (2013.01); *B27B 5/243* (2013.01)

(58) Field of Classification Search
CPC .... B23D 45/02; B23D 45/021; B23D 45/024; B23D 45/06; B23D 45/061; B23D 45/062; B23D 45/14; B23D 45/025; B26D 7/2628; B26D 7/2642

USPC ........... 83/471.3, 472, 473, 477, 477.1, 477.2
See application file for complete search history.

(56) References Cited

U.S. PATENT DOCUMENTS

| | | | | |
|---|---|---|---|---|
| 5,123,317 | A * | 6/1992 | Barnes et al. | 83/98 |
| 5,875,698 | A * | 3/1999 | Ceroll et al. | 83/473 |
| 6,722,242 | B2 * | 4/2004 | Chuang | 83/471.3 |
| 7,320,270 | B2 * | 1/2008 | Liu et al. | 83/471.3 |
| 2005/0199113 | A1 * | 9/2005 | Ku et al. | 83/473 |
| 2008/0196569 | A1 * | 8/2008 | Chuang | 83/477.1 |
| 2011/0041667 | A1 * | 2/2011 | Chiang | 83/477.1 |
| 2011/0079128 | A1 * | 4/2011 | Liu et al. | 83/477.1 |
| 2014/0311312 | A1 * | 10/2014 | Frolov et al. | 83/473 |

* cited by examiner

*Primary Examiner* — Phong Nguyen

(57) ABSTRACT

Supports for a table saw blade assembly are provided and each support includes an elongated L-shaped bracket releasably secured to the upper cutting surface and including a curved slot; a pivotal plate including a projection slidable in the curved slot, and two holes through the projection and the pivotal plate; a first clamping plate; and a second clamping plate. The first clamping plate, the bracket, the pivotal plate, and the second clamping plate are fastened together with the pivotal plate being capable of sliding along the curved slot.

1 Claim, 14 Drawing Sheets

SUPPORTS FOR A TABLE SAW BLADE ASSEMBLY

BACKGROUND OF THE INVENTION

1. Field of the Invention

The invention relates to table saws and more particularly to two supports for providing a sufficient support to a tilted blade assembly of a table saw.

2. Description of Related Art

Table saw is a woodworking tool consisting of a circular saw blade, mounted on an arbor which is driven by an electric motor. The blade protrudes through the surface of a table, which provides support for the material (e.g., wood) being cut.

U.S. Pat. No. 5,123,317 discloses a support structure for a table saw blade assembly which includes a cast aluminum bracket member with a rectangular opening upon which is movably supported the saw blade assembly. The bracket member is formed with a cavity for containing the saw blade and a discharge chute communicating with the cavity. A cover plate encloses the cavity. On the other side of the bracket member there are stiffening ribs for reducing the vibration of the bracket member. The density of the stiffening ribs increases as the distance from the opening decreases.

Notwithstanding the prior art, the invention is neither taught nor rendered obvious thereby.

SUMMARY OF THE INVENTION

It is therefore one object of the invention to provide a table saw comprising a base including an upper cutting surface; a front rail and a rear rail disposed on a front edge and a rear edge of the upper cutting surface respectively; a moveable rip fence disposed on one side of the upper cutting surface; a blade assembly including a circular saw blade extending upward from the upper cutting surface, and front and rear mounting members spaced by the saw blade; an adjustment wheel mounted on the base under the rear rail and being operative to tilt the blade assembly; and a rear support assembly and a front support assembly releasably secured to the mounting members respectively; wherein each of the rear and front support assemblies includes an elongated L-shaped bracket releasably secured to the upper cutting surface and including a curved slot; a pivotal plate including a projection slidable in the curved slot, and two holes through the projection and the pivotal plate; a first clamping plate; and a second clamping plate; wherein the first clamping plate, the bracket, the pivotal plate, and the second clamping plate are fastened together with the pivotal plate being capable of sliding along the curved slot.

The above and other objects, features and advantages of the invention will become apparent from the following detailed description taken with the accompanying drawings.

DETAILED DESCRIPTION OF THE INVENTION

Figure 1:
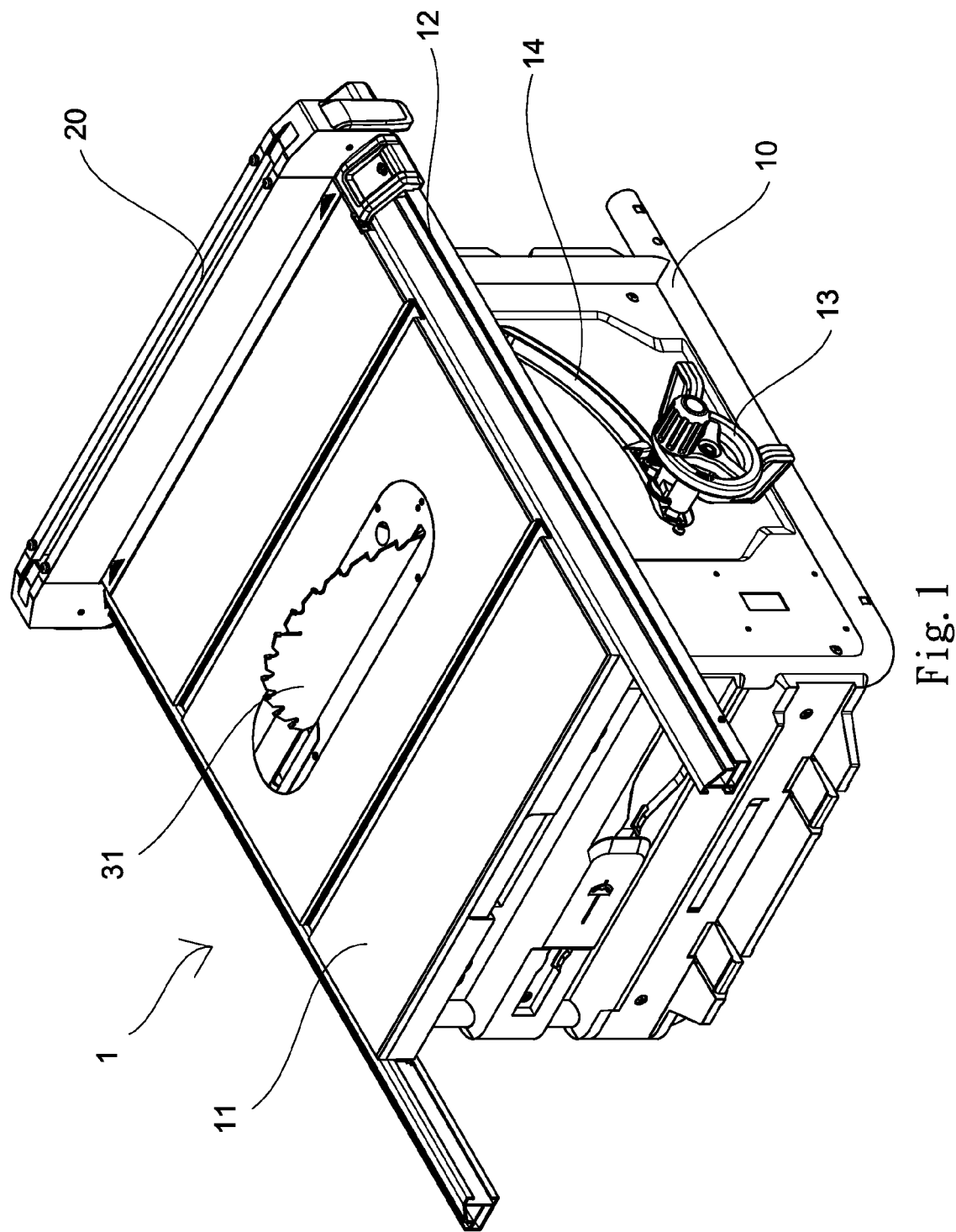
FIG. 1 is a perspective view of a table saw incorporating supports for a blade assembly according to the invention.
Figure 2:
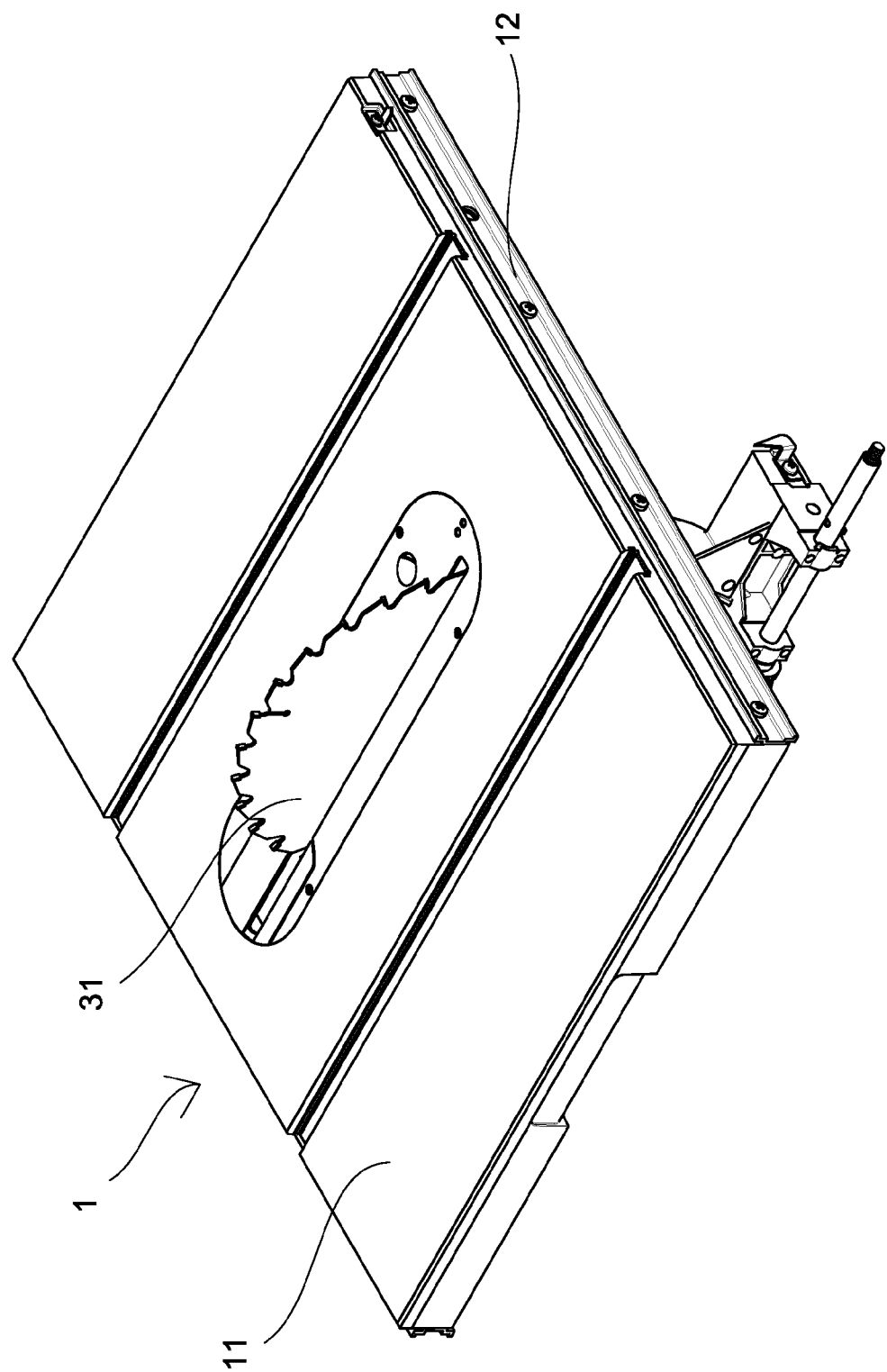
FIG. 2 is a perspective view of the blade assembly and the upper cutting surface.
Figure 3:
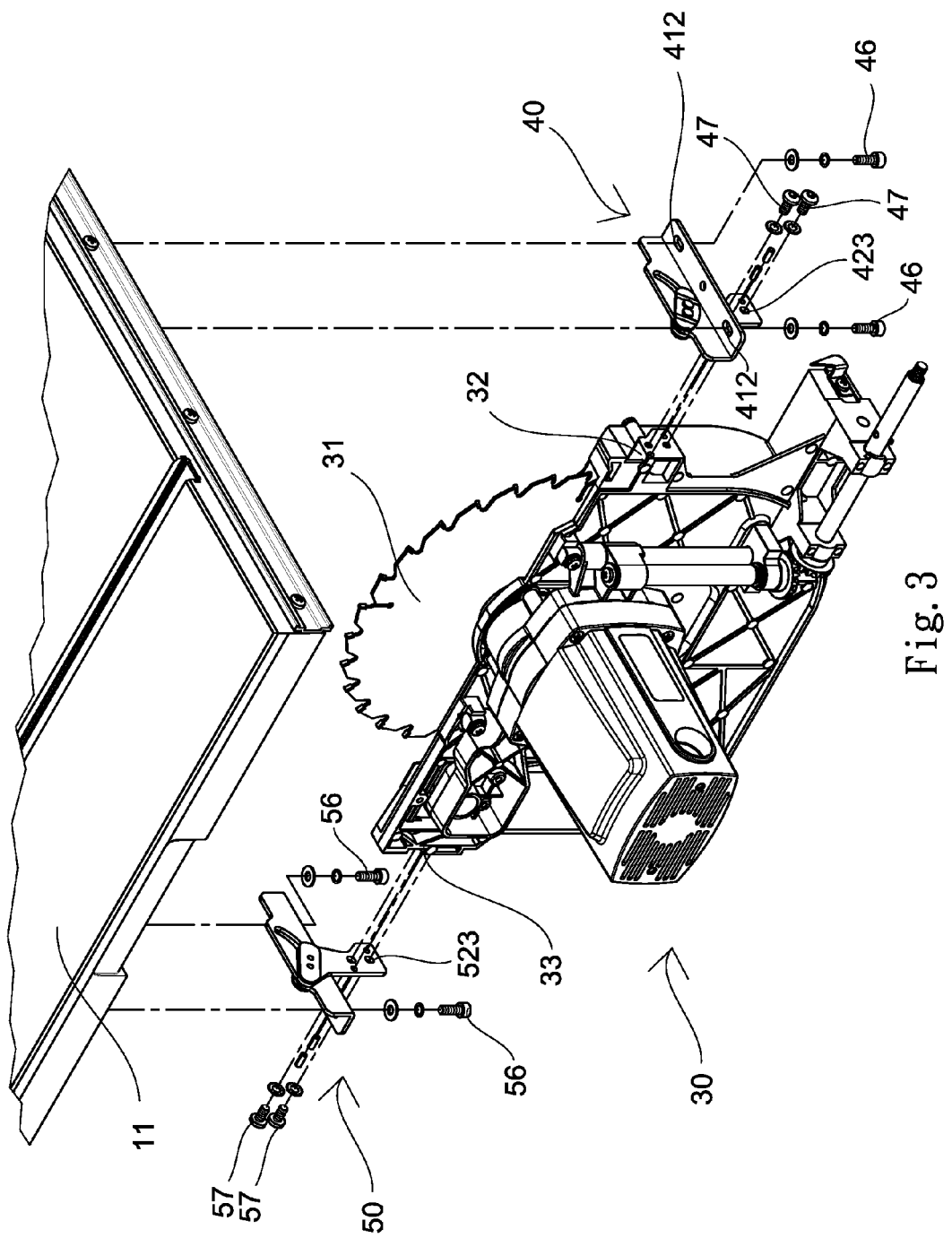
FIG. 3 is an exploded view of the blade assembly and the upper cutting surface.
Figure 4:
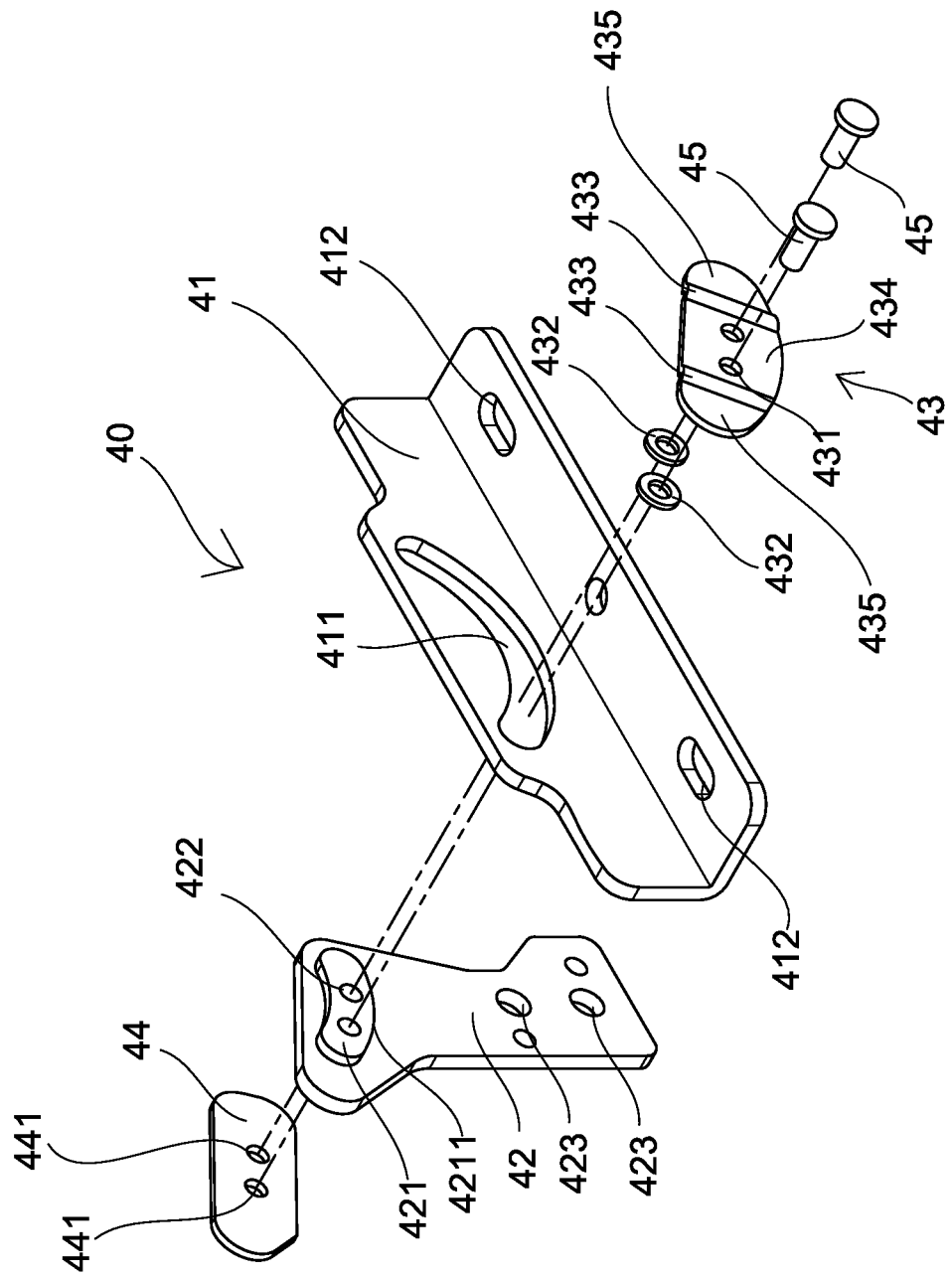
FIG. 4 is an exploded view of the front support assembly.
Figure 5:
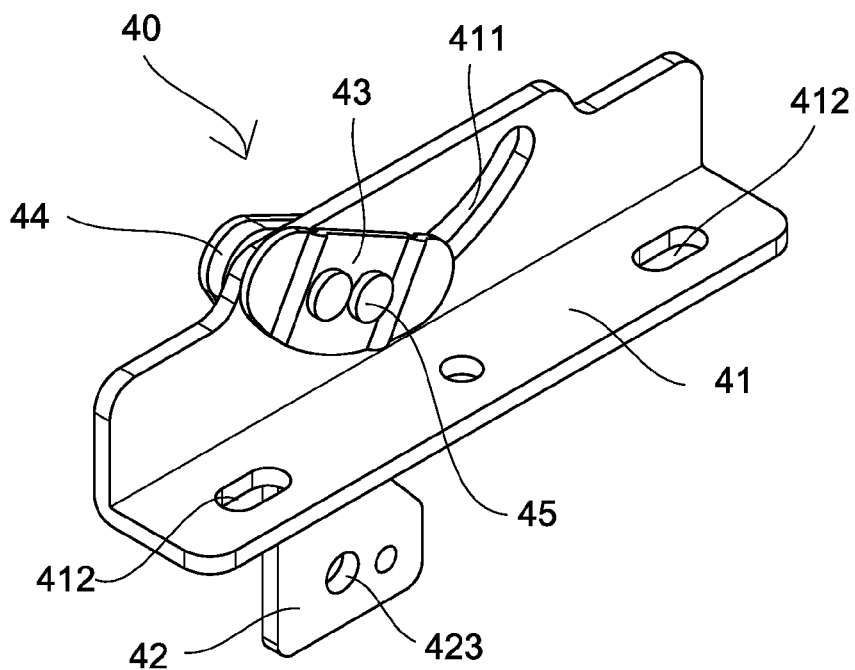
FIGS. 5 and 5a are two perspective views of the front support assembly viewed from the pivotal plate in different pivotal angles respectively.
Figure 5A:
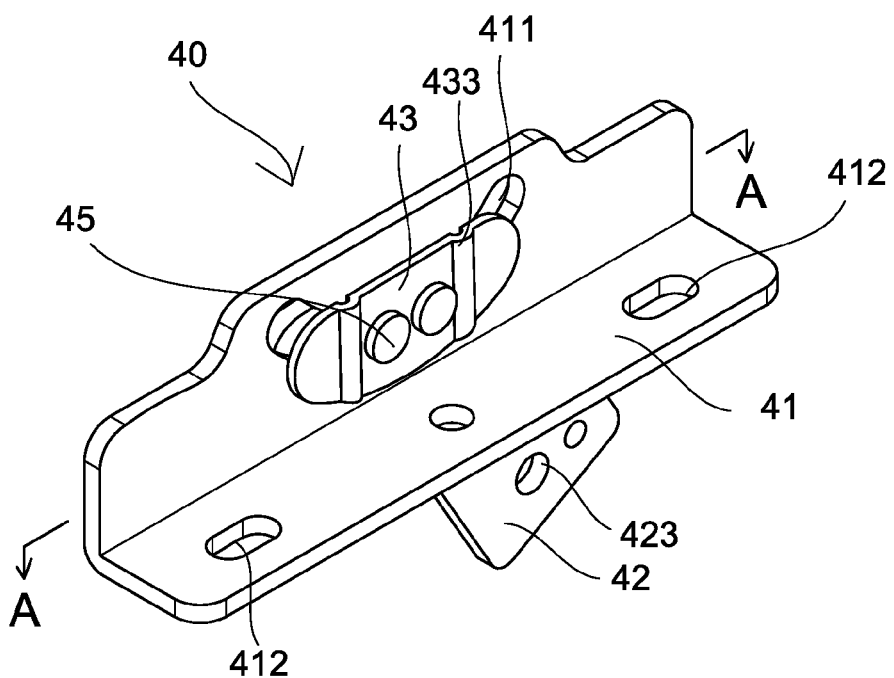
Figure 5B:
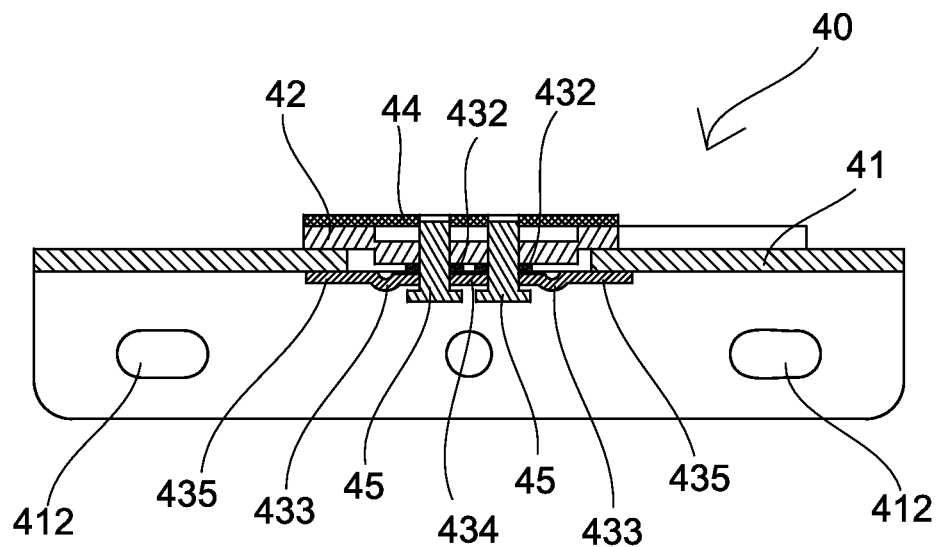
FIG. 5b is a sectional view taken along line A-A of FIG. 5a showing the front support assembly not being fastened by the rivets.
Figure 5C:
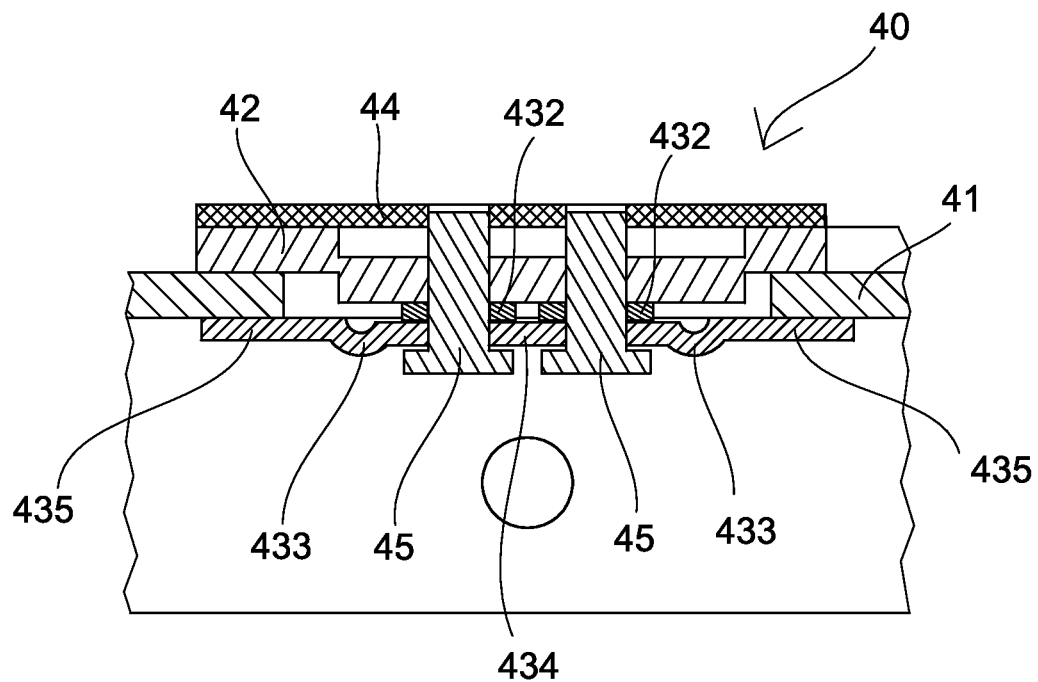
FIG. 5c is an enlarged view of a portion of FIG. 5b.
Figure 5D:
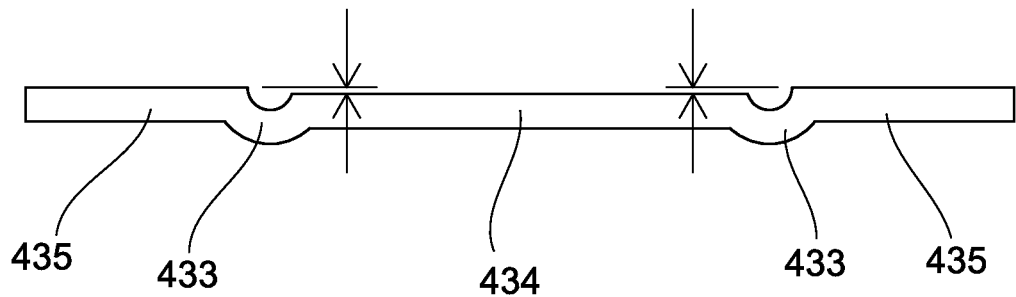
FIG. 5d is a top view of the first clamping plate showing an unevenness of the intermediate member and the side members.
Figure 5E:
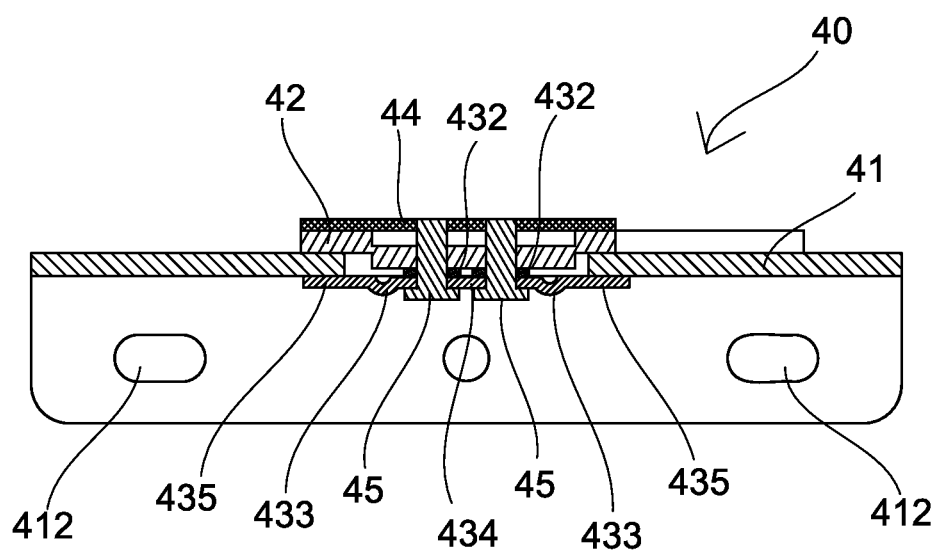
FIG. 5e is a sectional view taken along line A-A of FIG. 5a showing the front support assembly being fastened by the rivets.
Figure 5F:
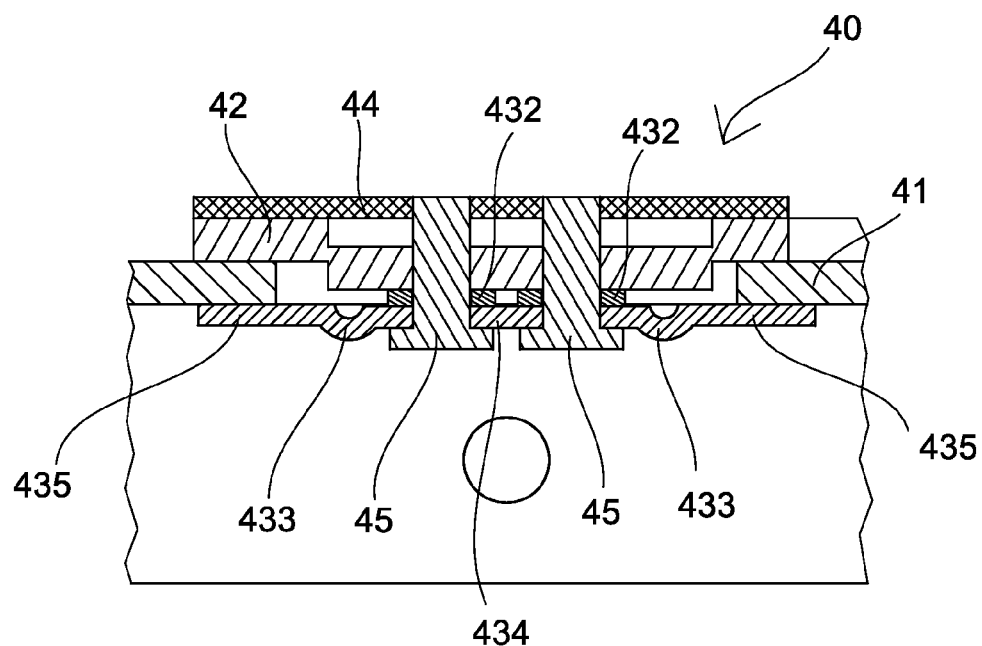
FIG. 5f is an enlarged view of a portion of FIG. 5e.
Figure 6:
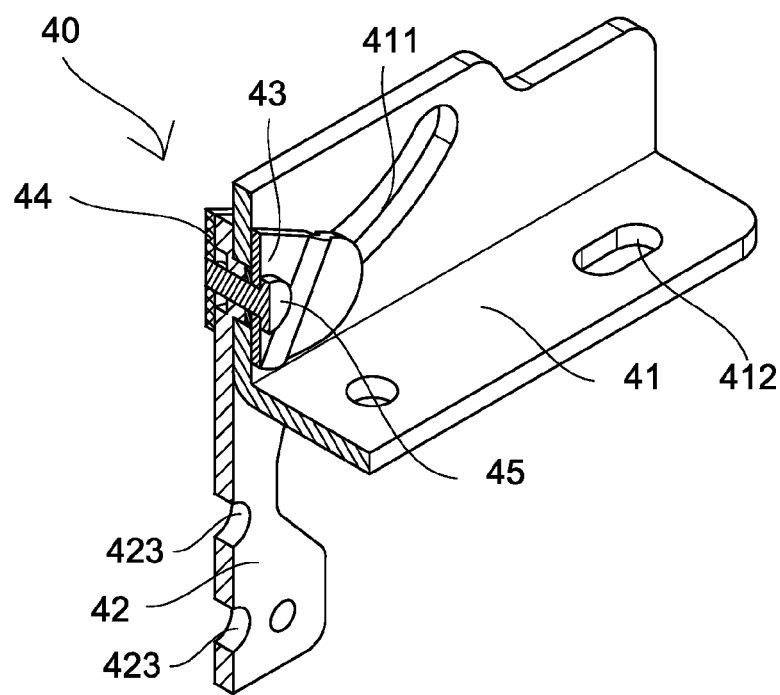
FIG. 6 is a longitudinal sectional view of the front support assembly shown in FIG. 5.
Figure 7:
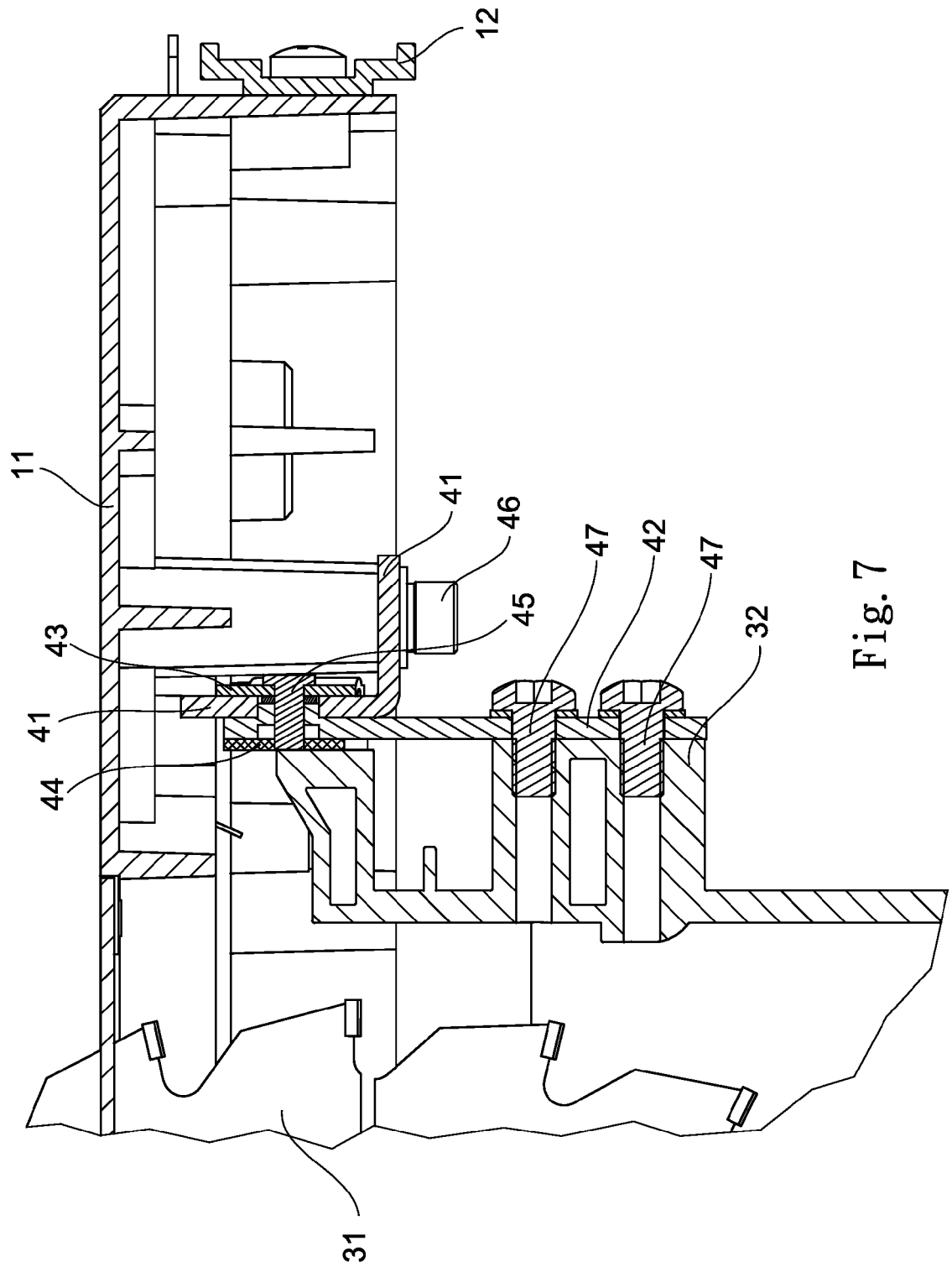
FIG. 7 is a partial longitudinal sectional view of a portion of the table saw of FIG. 1.
Figure 8:
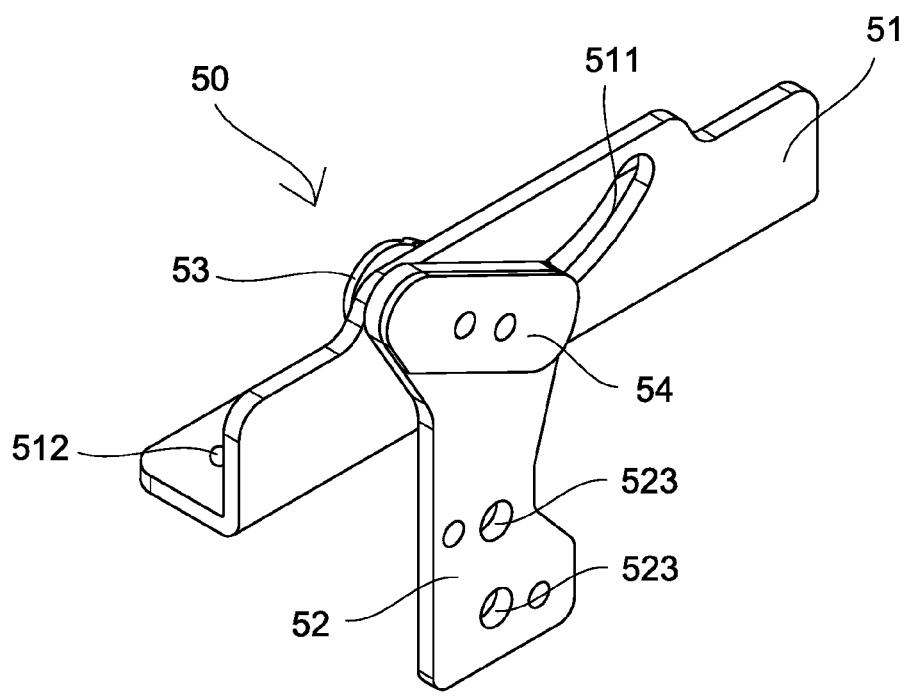
FIG. 8 is a perspective view of the rear support assembly.
Figure 9:
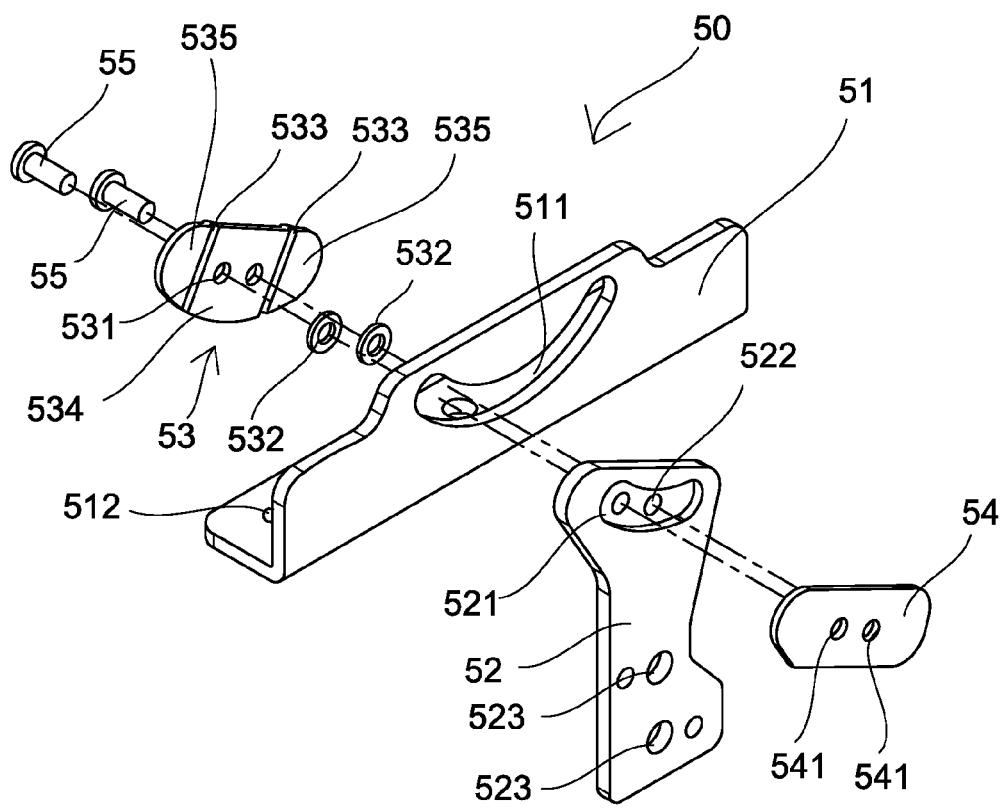
FIG. 9 is an exploded view of the rear support assembly.
Figure 10:
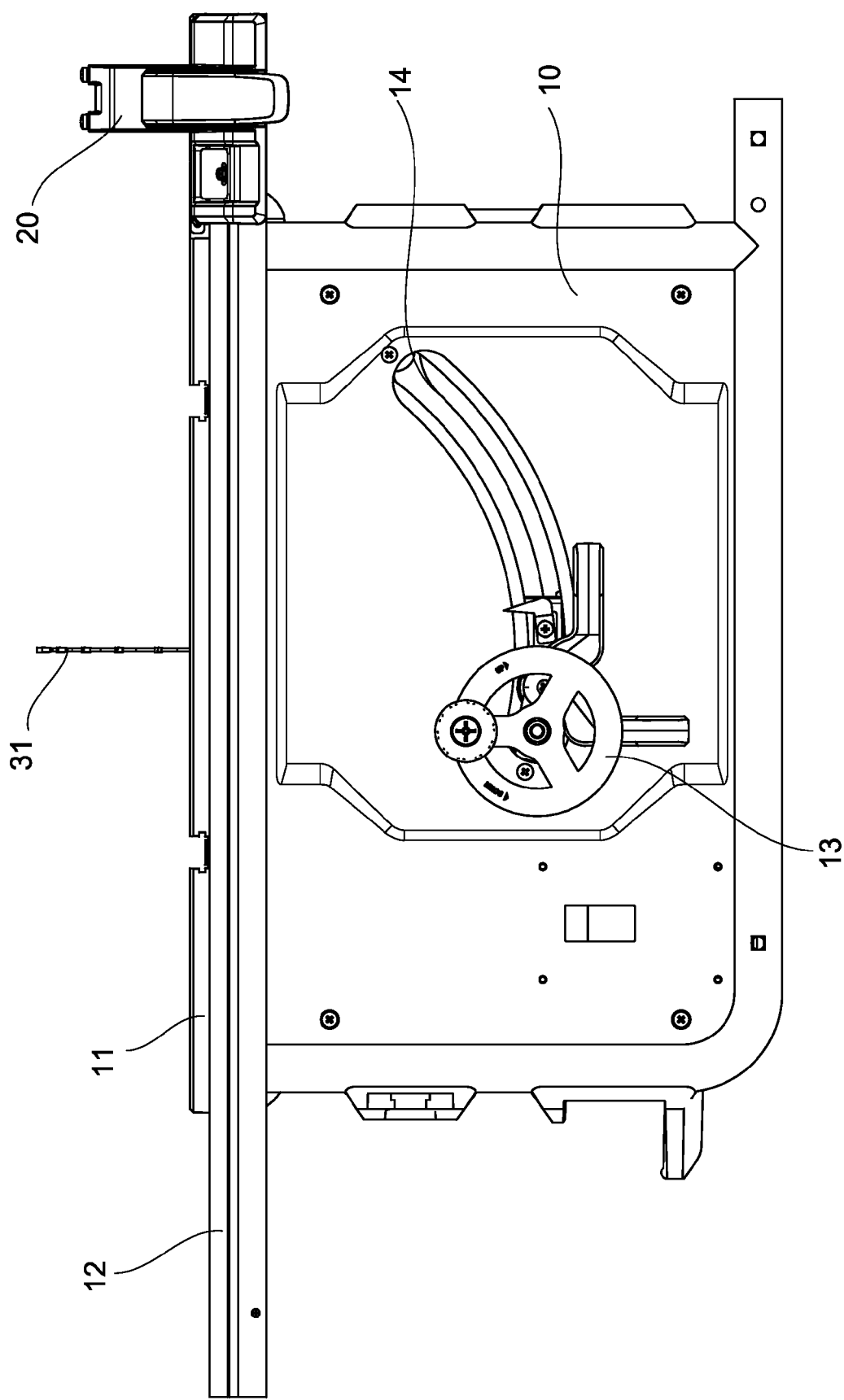
FIG. 10 is a front view of the table saw.
Figure 11:
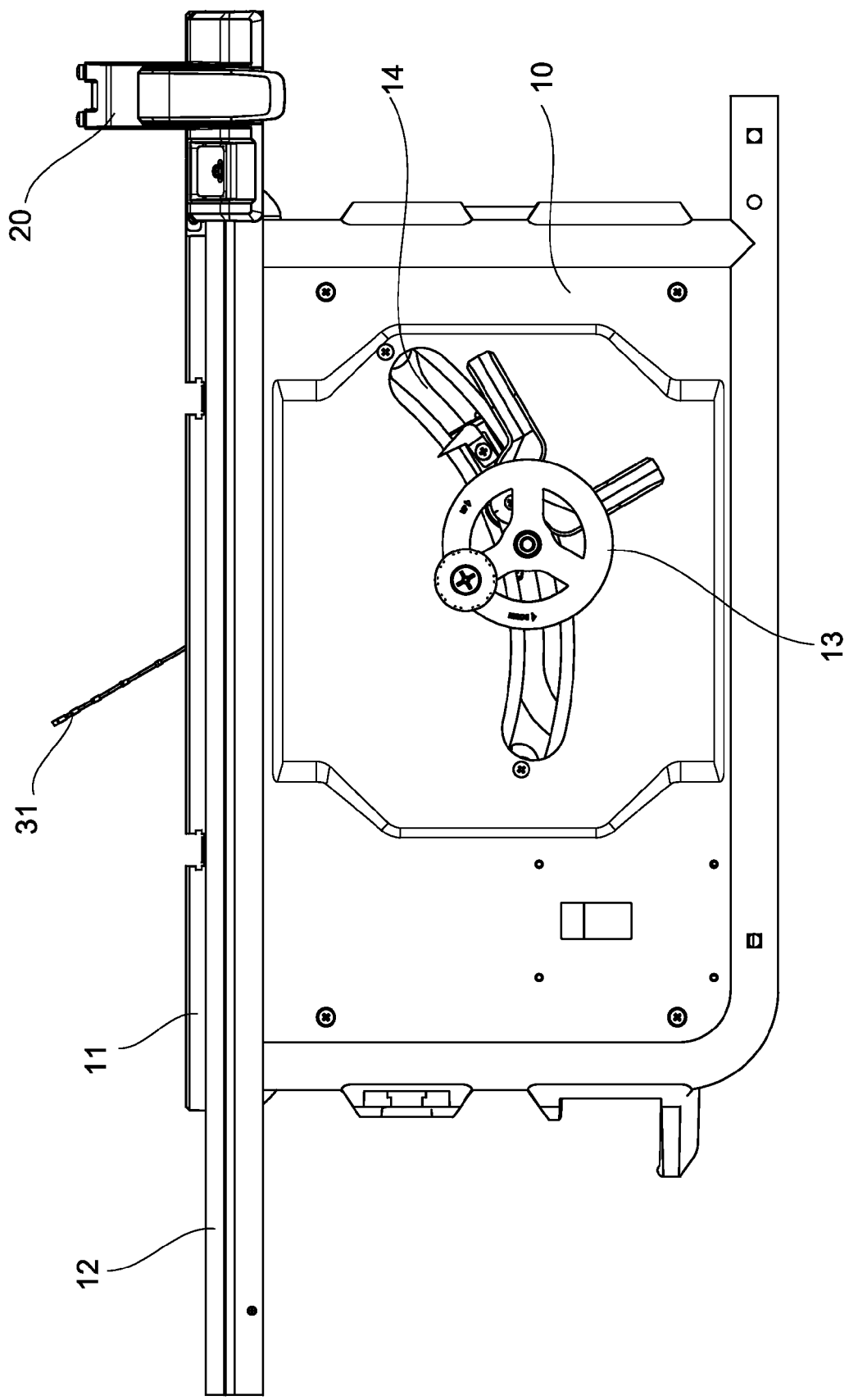
FIG. 11 a front view of the table saw with the saw blade being tilted after rotating the adjustment wheel.
Figure 11A:
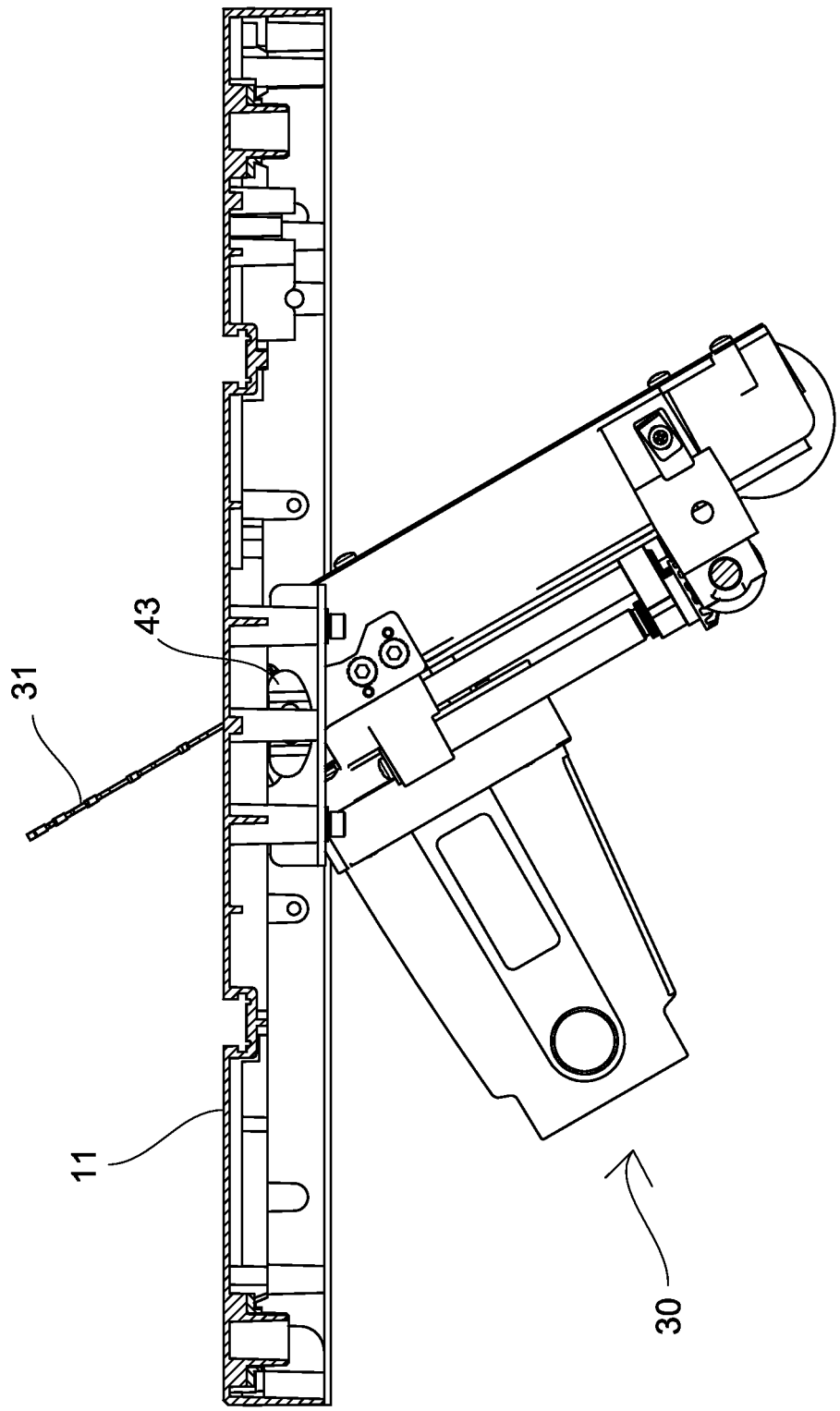
FIG. 11a is a partial longitudinal sectional view of the table saw of FIG. 11.

Referring to FIGS. 1 to 11a, a table saw 1 in accordance with the invention is shown and comprises a base 10, an upper cutting surface 11 mounted on the base 10, two parallel rails 12 mounted on front and rear edges of the upper cutting surface 11 respectively, a rip fence 20 disposed on the right side of the upper cutting surface 11 in a locked position and slidably mounted on the rails 12, and an adjustment wheel 13 moveably mounted on curved slot 14 on a front surface of the base 10.

The table saw 1 further comprises a blade assembly 30 including a circular saw blade 31 extending upward from the upper cutting surface 11 to be adapted to cut a substance, e.g., wood. The blade assembly 30 further comprises front and rear mounting members 32, 33 spaced by the saw blade 31.

The table saw 1 further comprises a front support assembly 40 threadedly secured to the front mounting member 32, and a rear support assembly 50 threadedly secured to the rear mounting member 33. The rear support assembly 50 is a mirror image of the front support assembly 40.

The front support assembly 40 comprises a bracket 41 of being an elongated L-shaped member, the bracket 41 including a curved slot 411 on a vertical portion and two spaced first holes 412 on the horizontal portion; a pivotal plate 42 including a projection 421 proximate one end, the projection 421 having a convex bottom 4211 shaped to be slidable in the slot 411, two hole members 422 through the projection 421 and the pivotal plate 42, and two second holes 423; a first clamping plate 43 including a flat intermediate member 434, two through holes 431 through the intermediate member 434, two washers 432 disposed between the intermediate member 434 and the through holes 431, two longitudinal grooves 433 on both sides of the intermediate member 434 respectively, and two side members 435 extending out of the grooves 433 in opposite directions, the side members 435 being offset with respect to the intermediate member 434; a second clamping plate 44 including two through holes 441; two rivets 45 driven through the through holes 431, the washers 432, the hole members 422, and the through holes 441 to assemble the first clamping plate 43, the bracket 41, the pivotal plate 42, and the second clamping plate 44; two first threaded fasteners 46 driven through the first holes 412 into the upper cutting surface 11 to fasten the front support assembly 40 and the upper cutting surface 11 together; and two second threaded fasteners 47 driven through the second holes 423 into the front mounting member 32 to fasten the front support assembly 40 and the front mounting member 32 together. The bracket 41 is fastened by frictionally engaging with the side members 435 of the first clamping plate 43. Further, the curved slot 411 has a concave surface complementary to a convex bottom 4211 of the projection 421. Thus, the pivotal plate 42 is adapted to slide along the slot 411. Further, the bracket 41 is threadedly secured to the upper cutting surface 11. Furthermore, the pivotal plate 42 (i.e., the front support assembly 40) is threadedly secured to the front mounting member 32.

The rear support assembly 50 comprises a bracket 51 of being an elongated L-shaped member, the bracket 51 including a curved slot 511 on a vertical portion and two spaced first holes 512 on the horizontal portion; a pivotal plate 52 including a projection 521 proximate one end, the projection 521 having a convex bottom 5211 shaped to be slidable in the slot 511, two hole members 522 through the projection 521 and the pivotal plate 52, and two second holes 523; a first clamping plate 53 including a flat intermediate member 534, two through holes 531 through the intermediate member 534, two washers 532 disposed between the intermediate member 534 and the through holes 531, two longitudinal grooves 533 on both sides of the intermediate member 534 respectively, and two side members 535 extending out of the grooves 533 in opposite directions, the side members 535 being offset with respect to the intermediate member 534; a second clamping plate 54 including two through holes 541; two rivets 55 driven through the through holes 531, the washers 532, the hole members 522, and the through holes 541 to assemble the first clamping plate 53, the bracket 51, the pivotal plate 52, and the second clamping plate 54; two first threaded fasteners 56 driven through the first holes 512 into the upper cutting surface 11 to fasten the rear support assembly 50 and the upper cutting surface 11 together; and two second threaded fasteners 57 driven through the second holes 523 into the rear mounting member 33 to fasten the rear support assembly 50 and the rear mounting member 32 together. The bracket 51 is fastened by frictionally engaging with the side members 535 of the first clamping plate 53. Further, the curved slot 511 has a concave surface complementary to a convex bottom 5211 of the projection 521. Thus, the pivotal plate 52 is adapted to slide along the slot 511. Further, the bracket 51 is threadedly secured to the upper cutting surface 11. Furthermore, the pivotal plate 52 (i.e., the rear support assembly 50) is threadedly secured to the rear mounting member 33.

Figure 10A:
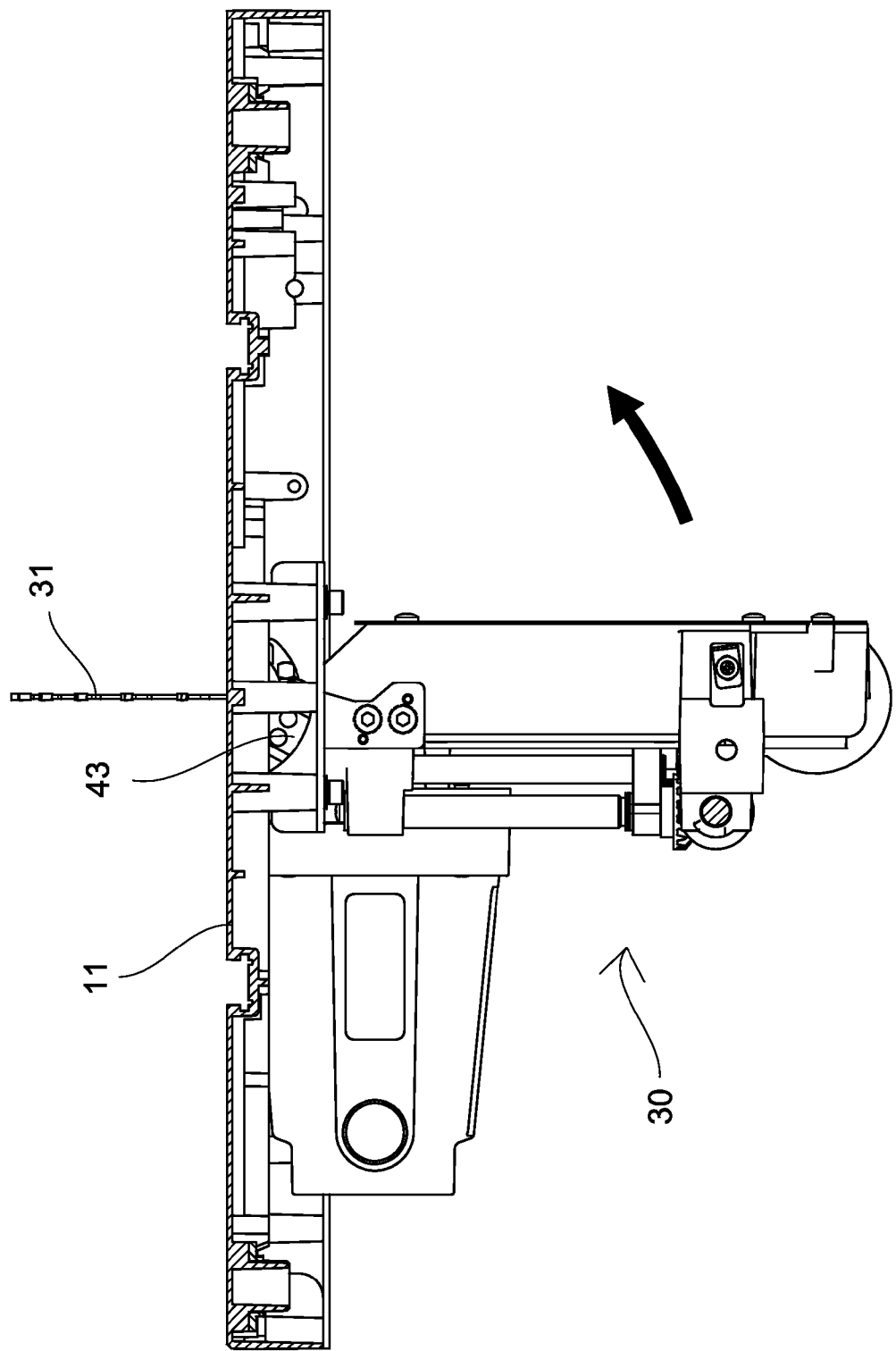
FIG. 10a is a partial longitudinal sectional view of the table saw of FIG. 10.

As shown in FIGS. 10, 10a, 11, and 11a, an individual may rotate the adjustment wheel 13 by moving along the slot 14 to tilt the blade assembly 30 and the saw blade 31. Also, the pivotal plates 42, 52 are adapted to slide along the slots 411, 511 respectively. It is envisaged by the invention that the weight of the tilted blade assembly 30 is sufficiently supported by both the front support assembly 40 and the rear support assembly 50. Therefore, a potential drop of the blade assembly 30 is avoided.

While the invention has been described in terms of preferred embodiments, those skilled in the art will recognize that the invention can be practiced with modifications within the spirit and scope of the appended claims.

What is claimed is:

1. A table saw comprising:
a base including an upper cutting surface;
a front rail and a rear rail disposed on a front edge and a rear edge of the upper cutting surface respectively;
a moveable rip fence disposed on one side of the upper cutting surface;
a blade assembly including a circular saw blade extending upward from the upper cutting surface, and front and rear mounting members spaced by the saw blade;
an adjustment wheel mounted on the base under the front rail and being operative to tilt the blade assembly; and
a rear support assembly and a front support assembly releasably secured to the mounting members respectively;
wherein each of the rear and front support assemblies includes:
an elongated L-shaped bracket releasably secured to the upper cutting surface and including a curved slot;
a pivotal plate including a projection slidable in the curved slot, and two holes through the projection and the pivotal plate;
a first clamping plate; and
a second clamping plate;
wherein the first clamping plate, the bracket, the pivotal plate, and the second clamping plate are fastened together with the pivotal plate being capable of sliding along the curved slot;
wherein the first clamping plate of the front support assembly includes a flat intermediate member, and two longitudinal grooves on both sides of the intermediate member respectively, and two side members extending out of the grooves in opposite directions, the side members being offset with respect to the intermediate member; and wherein the first clamping plate of the rear support assembly includes a flat intermediate member, and two longitudinal grooves on both sides of the intermediate member respectively, and two side members extending out of the grooves in opposite directions, the side members being offset with respect to the intermediate member;
wherein the pivotal plate of the front support assembly includes two second holes; the front support assembly further comprises two second threaded fasteners driven through the second holes into the front mounting member to fasten the front support assembly and the front mounting member together; and the pivotal plate of the rear support assembly further comprises two second holes; the rear support assembly further comprises two second threaded fasteners driven through the second holes into the rear mounting member to fasten the rear support assembly and the rear mounting member together; and
wherein the projection has a convex bottom complementary to a concave surface of the curved slot; and wherein the pivotal plate of the rear support assembly includes a second projection proximate one end, the second projection having a convex bottom complementary to a concave surface of the curved slot.

* * * * *